United States Patent
Aspnes et al.

(10) Patent No.: US 6,411,381 B1
(45) Date of Patent: Jun. 25, 2002

(54) METHOD OF REDUCING NOISE GENERATED BY ARC LAMPS IN OPTICAL SYSTEMS EMPLOYING SLITS

(75) Inventors: David E. Aspnes, Apex, NC (US); Martin Ebert, Fremont, CA (US)

(73) Assignee: North Carolina State University, Raleigh, NC (US)

( * ) Notice: Subject to any disclaimer, the term of this patent is extended or adjusted under 35 U.S.C. 154(b) by 0 days.

(21) Appl. No.: 09/562,256

(22) Filed: May 2, 2000

Related U.S. Application Data

(60) Provisional application No. 60/136,718, filed on May 28, 1999.

(51) Int. Cl.[7] .............................. G01J 3/04; G01J 3/10
(52) U.S. Cl. ..................... 356/326; 356/331; 356/369
(58) Field of Search .................. 356/300, 319, 356/323, 325, 326, 328, 369, 331, 334

(56) References Cited

U.S. PATENT DOCUMENTS

| | | | |
|---|---|---|---|
| 4,076,420 A | 2/1978 | De Maeyer et al. | 356/73 |
| 4,492,466 A | 1/1985 | Aspnes | 356/334 |
| 5,627,671 A | 5/1997 | Yamura et al. | 359/232 |
| 5,661,589 A | 8/1997 | Meyer | 359/232 |
| 5,675,411 A | 10/1997 | Brooks et al. | 356/328 |
| 5,684,582 A | 11/1997 | Eastman et al. | 356/328 |
| 5,719,672 A | 2/1998 | Chien | 356/328 |
| 5,751,415 A | 5/1998 | Smith et al. | 356/301 |
| 5,757,536 A | 5/1998 | Ricco et al. | 359/224 |
| 5,767,965 A | 6/1998 | Zhou et al. | 356/328 |
| 5,784,158 A | 7/1998 | Stanco et al. | 356/326 |
| 5,798,837 A | 8/1998 | Aspnes et al. | 356/369 |
| 5,835,210 A | 11/1998 | Ershov | 356/328 |
| 5,872,630 A | 2/1999 | Johs et al. | 356/369 |
| 5,877,859 A | 3/1999 | Aspnes et al. | 356/364 |

*Primary Examiner*—F L Evans
(74) *Attorney, Agent, or Firm*—Myers Bigel Sibley & Sajovec

(57) ABSTRACT

A spectroscopy system having enhanced noise reduction that comprises (i) an arc lamp light source of emitted light, which emitted light is projected as an image of the light source; (ii) a slit aperture through which the emitted light is projected; and (iii) a detector operably associated with the slit aperture for detecting the emitted light. The slit aperture, the arc lamp, and the image of the arc lamp each have a major axis. The major axis of the slit aperture is oriented essentially orthogonally to the major axis of the image of the arc lamp, so that the signal-to-noise ratio of the spectroscopy system is improved as compared to the signal-to-noise ratio of the spectroscopy system when the major axis of the slit aperture is oriented essentially parallel to the major axis of the image of the arc lamp.

23 Claims, 4 Drawing Sheets

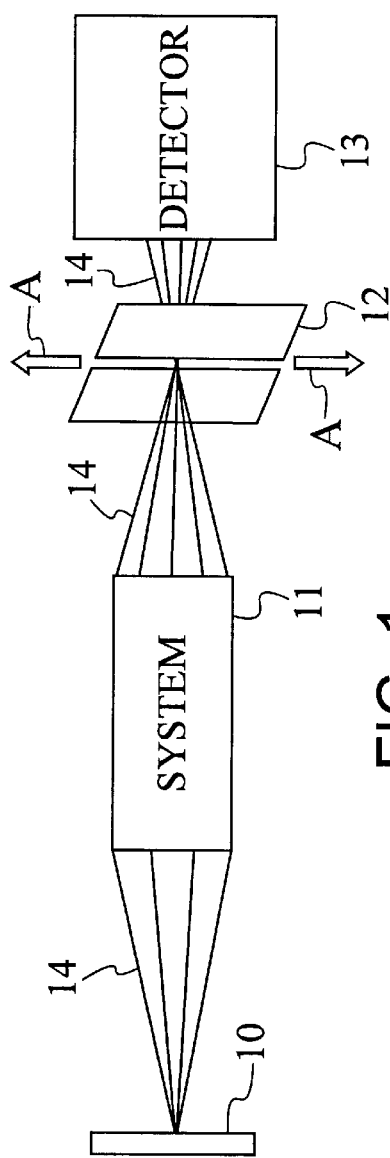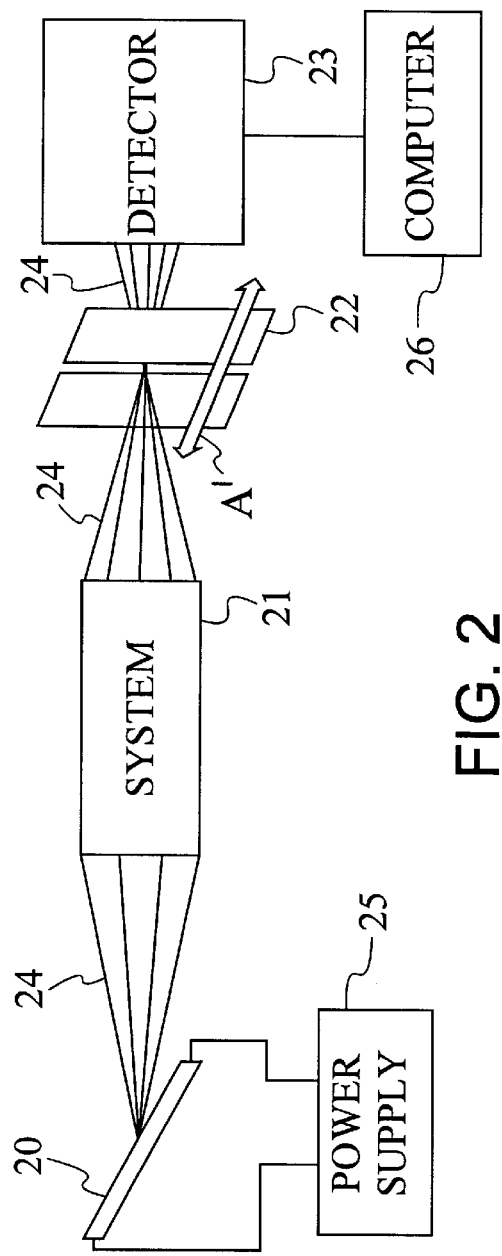

METHOD OF REDUCING NOISE GENERATED BY ARC LAMPS IN OPTICAL SYSTEMS EMPLOYING SLITS

This application claims priority from Provisional Patent Application No. 60/136,718, filed May 28, 1999, the disclosure of which is incorporated by reference herein in its entirety.

FIELD OF THE INVENTION

The present invention relates to spectroscopy methods and apparatus, including both monochromator and spectrometer methods and apparatus, and particularly relates to methods of improving the signal-to-noise ratios therein.

BACKGROUND OF THE INVENTION

Spectroscopy systems include monochromators and/or spectrometers. Monochromators are optical instruments designed to separate light consisting of a multiplicity of wavelengths into its separate components and to deliver light of a single wavelength or relatively narrow band of wavelengths to an optical system or an optical detector. Spectrometers are instruments used to disperse light, including light that may have interacted with an optical system, for the purpose of determining its intensity as a function of photon wavelength or energy. When used for characterization purposes, for example material characterization by reflection or transmission, monochromators and/or spectrometers are components of more general optical systems that typically include a source of illumination such as an incandescent or arc lamp as well as some means of directing the illumination from the source either onto the monochromator for subsequent interaction with the remainder of the system or onto the spectrometer after the light has interacted with the system.

Monochromators and spectrometers are used as components in a wide variety of industrial and scientific applications. For example, either a monochromator or a spectrometer is generally part of a spectroscopic ellipsometer, an optical system that is widely used to characterize bulk materials, thin films, surfaces, and interfaces for such properties as composition, microstructure, and thickness. See, e. g., Aspnes et al., U.S. Pat. No. 5,877,859 and Aspnes et al., U.S. Pat. No. 5,798,837.

The performance or signal-to-noise ratio of an optical system containing a broadband or white-light source is theoretically limited only by shot noise, the intrinsic statistical fluctuation of the number of photons recorded by the detector at a given wavelength or range of wavelengths per unit time. However, numerous other effects, such as mechanical vibration of the system components, fluctuations in refractive index of air in the vicinity of the source, or arc wander in the case of an arc lamp, can all act to increase noise and therefore to degrade the signal-to-noise ratio. The best performance is generally realized by incandescent lamps having relatively large area filaments that emit light when heated to a high temperature. Unfortunately, owing to intrinsic limitations of the filament material, the wavelengths available from incandescent sources are not adequate for many applications and arc lamps, which can emit at substantially shorter wavelengths, must be used, usually at a cost of signal-to-noise ratio.

There is a need to improve signal-to-noise ratios of spectroscopy systems that use arc lamps. By improving signal-to-noise ratios, weaker signals can be detected, strong signals can be measured more quickly, and the performance of optical systems can be improved in general. Unfortunately, current spectroscopy systems that employ arc lamps are at a point where further improvements in signal-to-noise ratios are difficult to realize.

SUMMARY OF THE INVENTION

The present inventors unexpectedly found that the signal-to-noise ratio of an optical system employing an arc-lamp source and a spectrometer could be improved substantially by orienting the major axis of the arc lamp, i.e., the axis parallel to its electrodes, such that the image of its major axis at the entrance slit of the spectrometer is orthogonal to the major axis of the slit, i.e., to the long dimension of the slit. Insofar as the inventors are aware, in prior art the major axis of the arc lamp (and its image at the slit) is oriented generally parallel to the major axis of the slit. This is probably done because slits tend to be oriented vertically and arc lamps are generally oriented vertically.

A first aspect of the present invention is a spectroscopy system exhibiting less noise and therefore an enhanced signal-to-noise ratio. This system comprises:

(i) an arc lamp light source of emitted light, which emitted light is projected as an image of the light source and then interacts with the rest of the optical system;

(ii) a slit aperture through which the emitted light that has interacted with the rest of the optical system is projected; and (iii) a detector operably associated with the slit aperture for detecting the light after passing through the spectrometer.

The light projected onto the slit is an image of the arc lamp light source. By orienting the major axis of the image essentially orthogonal to the major axis of the slit, accomplished here by physically rotating the arc lamp, it was observed that the signal-to-noise ratio of the output signal from the detector was improved significantly relative to its value when the major axis of the image was essentially parallel to the slit. Thus the signal-to-noise ratio of the system is improved relative to its value when the major axis of the slit aperture is oriented parallel to the major axis of the image of the arc lamp.

A second aspect of the present invention is a method of enhancing the signal-to-noise ratio of a spectrometer, the method comprises:

(i) providing a spectrometer having an arc lamp light source of emitted light, which emitted light is projected as an image of the light source; a slit aperture through which the emitted light is projected; and a detector operably associated with the slit aperture for detecting the emitted light; wherein both the slit aperture, the arc lamp, and the image of the arc lamp each have a major axis; and (ii) orienting the major axis of the slit aperture essentially orthogonally to the major axis of the image of the arc lamp, so that the signal-to-noise ratio of the spectrometer is improved as compared to the signal-to-noise ratio of the spectrometer when the major axis of the slit aperture is oriented parallel to the major axis of the image of the arc lamp.

Without wishing to be bound to any particular theory of the invention, it is believed that the reason for the improvement is that in any arc lamp the arc within the lamp exhibits some wander or movement, which occurs mainly perpendicular to the major axis of the lamp. The arc wander occurs because the so-called "hot spot" from which the major fraction of the intensity originates is located at the positive electrode, the anode, which is the larger of the two electrodes of the lamp. As the lamp operates, motion of the hot spot is more likely to occur around the anode, i.e., orthogonally to the axis of the electrodes (the axis of the lamp), since in operation the hot spot remains at a fixed distance from the electrode. If the image of the arc at the entrance slit of the monochromator or spectrometer is larger than the width of the slit, owing to nonuniformities in intensity over the arc any motion is translated into a change of intensity and thus increased noise. However, if this motion is along the slit instead of perpendicular to it, the intensity change, and hence the generated noise, is clearly much less. The same comments apply to the situation where the "slit" may be defined by pixels in a diode-array detector.

The foregoing and other objects and aspects of the present invention are explained in greater detail in the drawings herein and the specification set forth below, in which:

BRIEF DESCRIPTION OF THE DRAWINGS

FIG. 1 is a schematic illustration of a prior art spectrometer, with the arc lamp oriented parallel to the slit;

FIG. 2 is a schematic illustration of a spectrometer of the present invention, with the arc lamp oriented orthogonally to the slit.

DETAILED DESCRIPTION OF PREFERRED EMBODIMENTS

Figure 3:
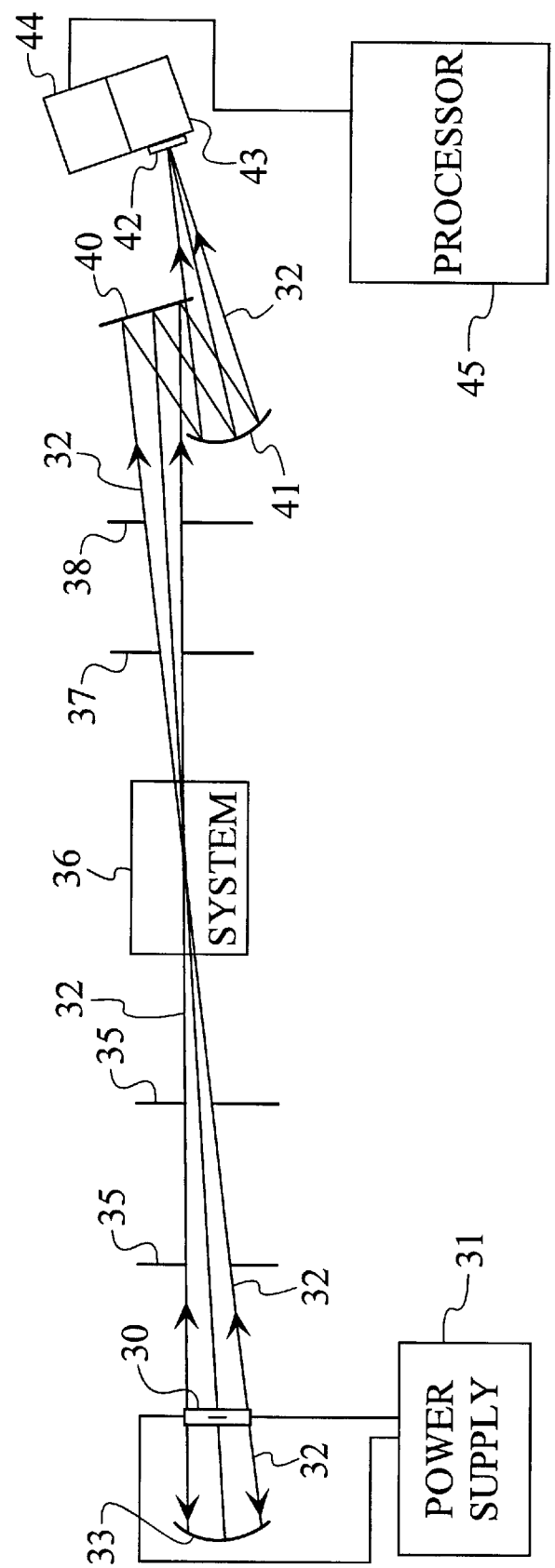
FIG. 3 is a schematic illustration of a specific embodiment of the present invention, which is a spectroscopic ellipsometer.

FIG. 1 illustrates a prior art spectrometer comprising an arc lamp 10, a system to be illuminated 11 (e.g., focusing optics, a sample with which the emitted light interacts e.g. via transmission or reflection, subsequent focusing optics, a slit 12, a dispersing element, and a detector 13. Emitted light 14 is projected from the arc lamp through the system, then through the slit, and finally onto the detector generally after some dispersion. Note that the major axis of the projected image denoted by arrow A of the arc lamp (which is generally parallel to the arc lamp itself) is oriented parallel to the major axis of the slit.

FIG. 2 illustrates a spectrometer of the present invention, again comprising an arc lamp 20, a system to be illuminated 21 as described above, a slit 22, and a detector 23. Again, emitted light 24 is projected from the arc lamp through the system, then through the slit, and finally onto the detector again generally after some dispersion. We show in addition a computer with appropriate hardware and/or software instructions provided as a data analysis means, in accordance with known techniques. Here, however, the major axis of the slit is oriented essentially orthogonally to the projected image of the major axis of the arc lamp denoted by arrow A'.

While it can be anticipated that the signal-to-noise achievable with any arc lamp will be improved if the above teachings are implemented, one important class of arc lamps 20 that can be used to carry out the present invention are those generally known as "short" arc lamps. The arc lamp preferably produces a spectrum of polychromatic light over a predetermined wavelength of interest, and preferably is a broadband light source that produces light over a wavelength range of 200 to 800 nanometers. Examples include xenon, xenon-mercury, and deuterium arc lamps. Xenon and xenon-mercury arc lamps are particularly preferred. Such arc lamps have a pair of oppositely facing electrodes, with the positive electrode (anode) being blunt at the end terminus thereof as compared to or relative to the negative electrode (cathode). Again, while the applicants do not wish to be bound to any particular theory of the invention, the wander or movement of the arc noted above occurs at the blunt electrode and is believed to occur around the electrode not parallel to the axis of the lamp.

Any suitable slit aperture 22 can be employed to carry out the present invention. In various preferred embodiments, the slit aperture has a width not greater than 10, 100, 250, 500 or 1000 microns. The slit may be adjustable or interchangeable in accordance with a variety of known techniques, Such as described in D. Meyer, Bilateral Slit Assembly, and Method of Use, U.S. Pat. No. 5,661,589; and in H. Yamura et al., Spectrometer Slit Switching Mechanism, U.S. Pat. No. 5,627,671.

As noted above, in the present invention the major axis of the slit aperture is oriented essentially orthogonally to the major axis of the image of the arc lamp. The term "essentially orthogonally" as used herein includes perpendicularly, and also includes orientations offset from a right angle. Thus, the major axis of the slit may be positioned at an angle of from about 60, 75 or 80 degrees to about 100, 105 or 120 degrees with respect to the major axis of the image of the arc lamp.

One possible means of orienting the major axis of the image of the arc lamp orthogonally to the major axis of the slit aperture is by physically orienting the major axis of the arc lamp itself such that its image at the entrance slit is orthogonal to the major axis of the slit aperture. However, the major axis of the image of the arc lamp can be rotated with reference to the slit by optical means rather than a physical rotation of the lamp. Thus, the apparatus of the invention may further comprise a Dove prism or an analogous combination of optical elements positioned between the arc lamp and the slit aperture for orienting the major axis of the image of the arc lamp orthogonal to the major axis of the slit aperture.

Any of a variety of detectors 23 may be employed, depending upon the particular apparatus or instrument in which the present invention is embodied, as discussed in greater detail below. In one preferred embodiment, the detector is a diode array detector. Typically, a diode array detector comprises a plurality of diodes arranged in a row adjacent to one another with a center-to-center spacing of e.g. 25 microns, and each diode (pixel) providing a measure of the intensity at a different wavelength or group of wavelengths. With these detectors the width of a single pixel determines the effective width of the slit, since any lateral the motion of the image is equivalent to a lateral motion of the array.

As also noted above, an apparatus of the invention typically includes an optical system 21 to be analyzed or interrogated by the emitted light, which optical system is positioned between the source and the slit aperture. The optical system may be a removable element of the apparatus. The optical system may be a transmission system or absorbance system in which the emitted light passes through a sample to be analyzed, such as in a gas or liquid analysis system (see, e.g., L. Smith et al., Raman Spectroscopy Apparatus and Method for Continuous Chemical Analysis of Fluid Streams, U.S. Pat. No. 5,751,415). The optical system may be that of a reflectance system or reflectometer, in which the emitted light is reflected off of a surface to be analyzed. In one embodiment, the invention is incorporated into an ellipsometer such as described in U.S. Pat. No. 5,798,837 to Aspnes et al., or U.S. Pat. No. 5,877,859 to Aspnes et al. (applicants intend that the disclosures of all U.S. patent references cited herein be incorporated by reference herein in their entirety). In another embodiment, the apparatus comprises a reflectance anisotropy spectrometer. Various monochrometers, spectrophotometers and other spectroscopy systems in which the present invention may be incorporated will be known to those skilled in the art. Thus the computer or processor 26 processes intensity information collected by the detector 23 in accordance with known techniques, depending on the particular test being carried out.

The step of orienting the major axis of the slit aperture orthogonally to the major axis of the image of the arc lamp may be carried out by physically orienting the arc lamp, or by optical means as described above. The orienting step may be carried out by fixing the orientation of the lamp or lamp image in the apparatus as it is manufactured, or by incorporating structure such as a rotating socket into the apparatus to provide means for rotating the lamp within the apparatus during use. Once oriented orthogonally, the signal-to-noise ratio of the spectrometer is improved as compared to the signal-to-noise ratio of the spectrometer when the major axis of the slit aperture is oriented parallel to the major axis of the image of the arc lamp. Such an apparatus preferably has a signal-to-noise ratio, when measuring modulated reflectance, in a modulation spectroscopy experiment, of at least 1 part in $10^5$ with a one second averaging time in the visible—near-UV spectral range. In an ellipsometer system, as compared to a system in which the image of the arc lamp is parallel, rather than orthogonal to the slit, a system of the present invention has a signal-to-noise ratio that is improved or enhanced by at least a factor of about 5, 7 or 10.

FIG. 3 illustrates a specific embodiment of the present invention, which is an ellipsometer. In general, the apparatus comprises an Osram XBO 75W/2 high pressure xenon short-arc lamp 30 powered by a power supply 31. Emitted light 32 is directed into a focusing mirror 33 and then through iris 34 and iris 35 onto system 36, which is generally a silicon wafer sample positioned in a vacuum chamber, with the angle of incidence of the emitted light onto the sample being 71.4 degrees. The light then passes through iris 37 and iris 38 onto plane mirror 40, which directs the light into focusing mirror 41. From the focusing mirror 41, the emitted light is directed onto the slit 42 of a Jobin Yvon Spectrograph 43 connected to a Princeton Instruments Model PDA-1024 diode array detector 44. The diode array detector 44 is connected to a processor 45 for processing the intensity information collected by the detector into ellipsometry information in accordance with known techniques.

Figure 4:
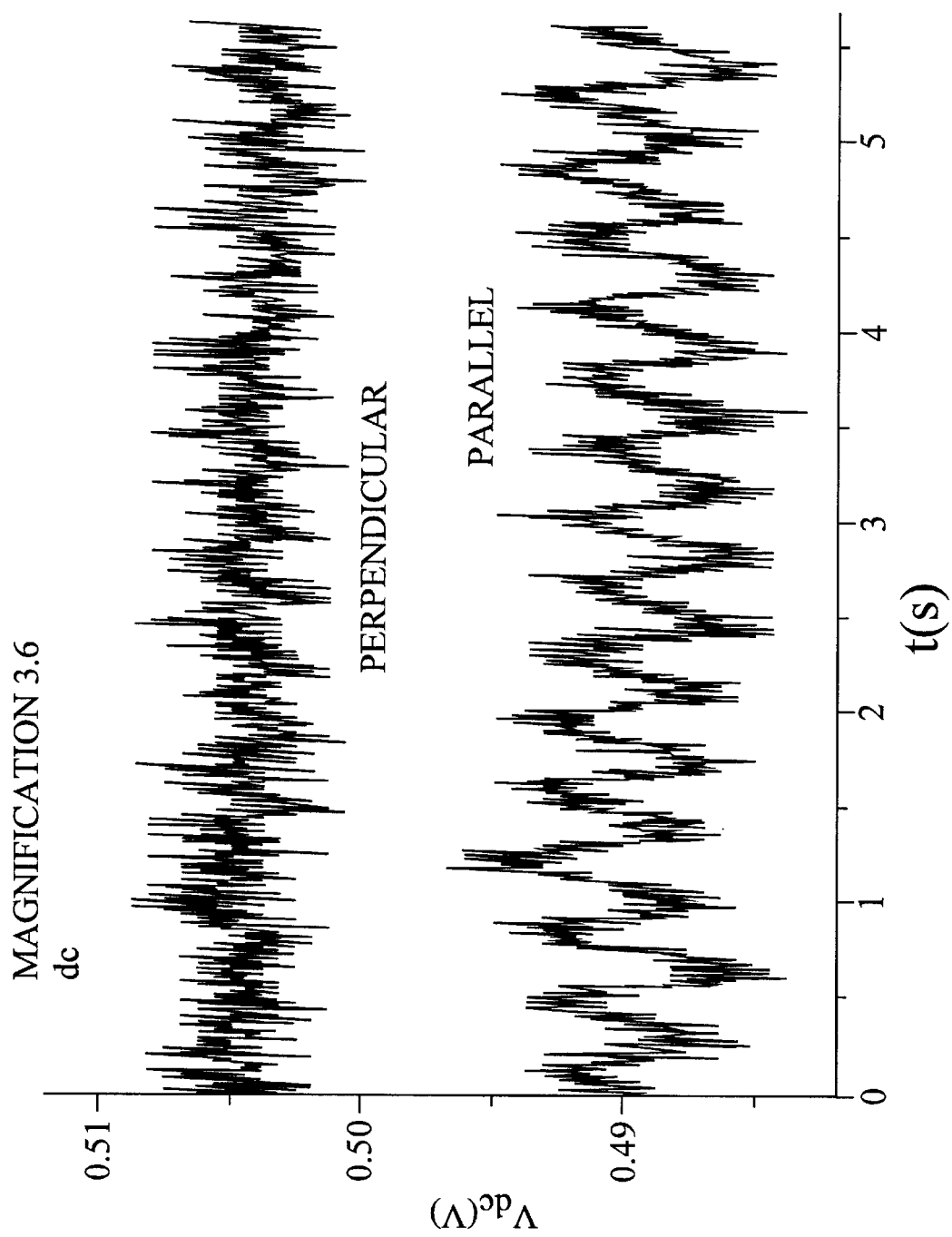
FIG. 4 illustrates the reduction in noise that occurs in a system with lamp orientation carried out in accordance with the present invention, with a comparison of output dc voltages sampled at 4 ms intervals for sequential 5.6 second periods for a monochromator slit oriented parallel and perpendicular to the lamp at an image magnification of 3.6. The difference in the type and overall amount of noise is clearly seen.
Figure 5:
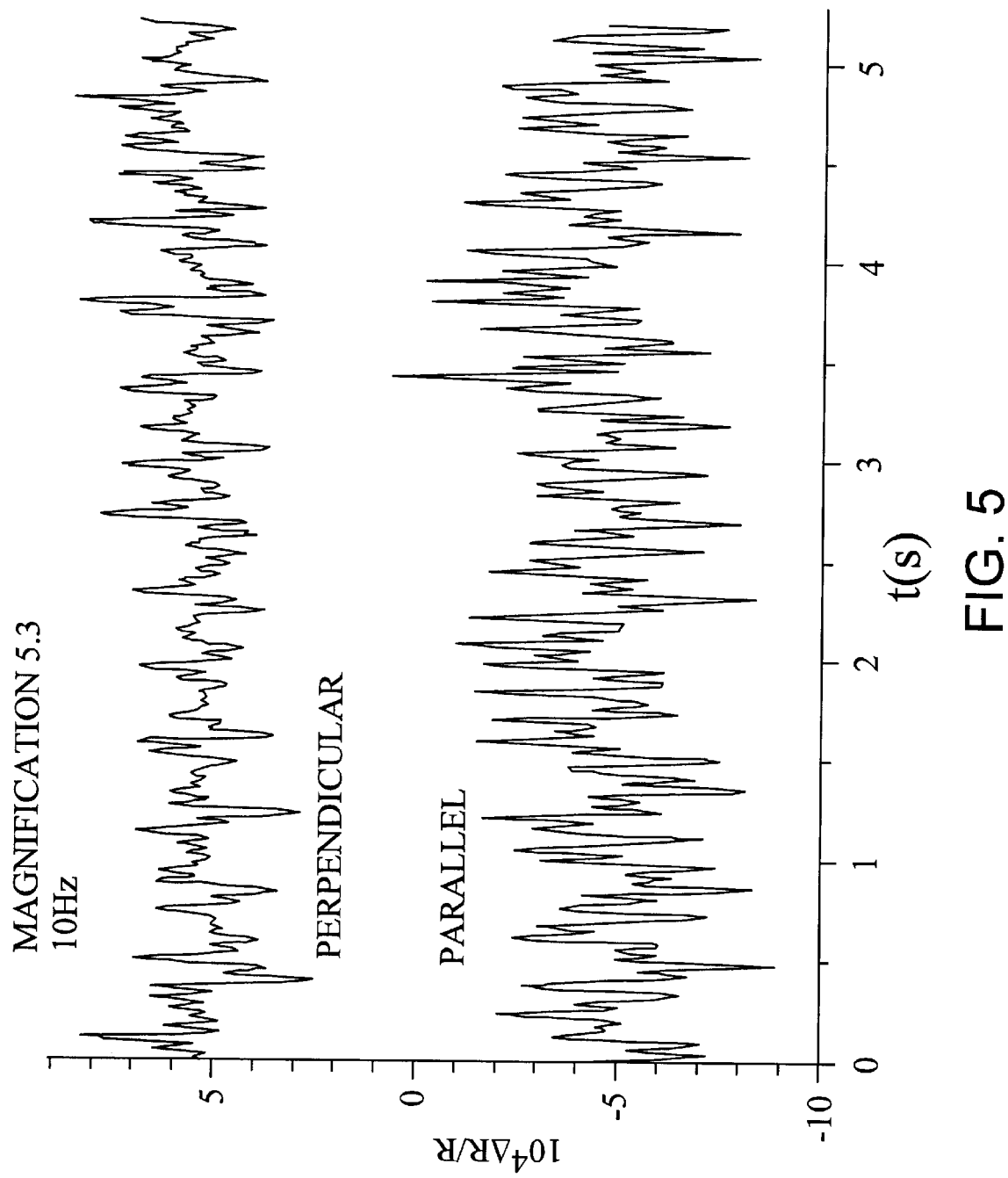
FIG. 5 further illustrates the reduction in noise that occurs in a system with lamp orientation carried out in accordance with the present invention, and particularly shows the output of the phase-sensitive detector in the dimensionless units obtained in RD spectrometry for an image magnification of 5.3 with the time constant set at 30 ms. The lower (parallel) trace exhibits a peak-to-peak amplitude variation about twice that of the perpendicular trace, consistent with the data shown in FIG. 4.

As an example of the reduction in noise that occurs with proper lamp orientation, FIGS. 4 and 5 show data obtained with a system constricted specifically to investigate the effect of operating a short-arc lamp both parallel and perpendicular to the entrance slit of a monochromator. The system consists of a 75 watt short-arc Xe arc lamp, a focusing lens, a filter, a 0.1 m focusing-grating monochromator with 500 micron entrance and exit slits, and a photomultiplier (PMT) detector. With the exception of the lens, these components were taken from a system that is ordinarily used for reflectance-difference spectroscopy (RDS). The output current of the PMT is converted to a voltage by means of an operational amplifier. The focusing lens is used to obtain different magnifications of the image of the lamp arc, nominally 250 microns wide, onto the entrance slit. The low-pass filter was used in conjunction with the wavelength-tuning capability of the monochromator to adjust the intensity transmitted to the PMT to allow operation at a nominal output voltage of about 0.50 V, the design voltage for the RD spectrometer. The output voltage was fed to a 12-bit analog-to-digital converter (ADC) and also a phase-sensitive detector set for bandpass detection at 10 Hz with a 30 ms time constant. The ADC sampled both the dc output and the output of the phase-sensitive detector at 4 ms intervals. A relatively short sampling interval was used to assess the frequency spectrum of the system noise.

To ensure that the noise spectrum measured was independent of all variables except the relative orientation of lamp and slit, the lamp was maintained in a vertical position and the filter, monochromator, and detector rotated as a unit. This ensured, for instance, that air currents over the lamp, which can be a significant and possibly variable source of intensity fluctuations, were the same for all relative orientations of lamp and slit. Once rotated, the filter/monochromator/detector unit was positioned so that the light intensity reaching the PMT was a maximum. Alignment procedures for maximizing intensity are typically performed in any spectrometer system to obtain the best signal-to-noise ratio consistent with component geometry, again taking all but the relative lamp-slit orientation out of consideration. We found that the maximum intensities so obtained were essentially independent of the relative orientation of the lamp and the slit, even though much more of the slit was illuminated for parallel alignment. This is not surprising, since most of the lamp output originates from a narrow region close to the tip of the larger (positive) electrode, with the remaining arc between the electrodes contributing substantially less.

FIG. 4 compares the output dc voltages sampled at 4 ms intervals for sequential 5.6 s periods for the monochromator slit oriented parallel and perpendicular to the lamp for an image magnification of 3.6. The difference in the type and overall amount of noise is readily apparent. The data for the parallel configuration are dominated by a frequency component at about 2.6 Hz. This component is essentially absent in the perpendicular configuration. We attribute this component to the arc-wander phenomenon described above, noting that for parallel operation and a magnification of 3.6 the width of the arc overfills the slit in parallel operation by a factor of about 2. It is clear that this frequency component will introduce substantial noise into any procedure that acquires data with a time constant of the order of 0.1 to 1 s, times typical of data acquisition in spectrometry. To assess this effect, FIG. 5 shows the output of the phase-sensitive detector in the dimensionless units obtained in RD spectrometry for an image magnification of 5.3 with the time constant set at 30 ms. The lower (parallel) trace exhibits a peak-to-peak amplitude variation about twice that of the perpendicular trace, consistent with the data shown in FIG. 4.

A more quantitative assessment can be obtained by comparing the meansquare deviations of the pairs of traces in FIGS. 4 and 5. In FIG. 4 the mean-square deviations are $2.40 \times 10^{-3}$ V and $1.44 \times 10^{-3}$ V for parallel and perpendicular operation, corresponding to an improvement of a factor of 1.7 perpendicular operation. In FIG. 5 the equivalent numbers are $1.5 \times 10^{-4}$, $0.86 \times 10^{-4}$, and 1.8, respectively. Thus the two results are consistent.

In principle we would expect every lamp to have different noise characteristics, and that these characteristics would have greater or lesser effect on the overall system noise depending on the configuration in which the lamp was used. For operation in a rotating-polarizer ellipsometer with an overall magnification of 20 and an array detector with a 250 micron entrance slit we have observed improvements of up to a factor of 10 for typical detection frequencies of a few Hz.

The foregoing is illustrative of the present invention, and is not to be construed as limiting thereof. The Invention is defined by the following claims, with equivalents of the claims to be included therein.

We claim:

1. A spectroscopy system having enhanced noise reduction, said spectroscopy system comprising:
    an arc lamp light source of emitted light, which emitted light is projected as an image of said light source;
    a slit aperture through which said emitted light image is projected; and
    a detector operably associated with said slit aperture for detecting said emitted light; wherein said arc lamp, and said image of said arc lamp, and said slit aperature each have a major axis;
    and wherein the major axis of said slit aperture is oriented essentially orthogonally to said major axis of said image of said arc lamp, so that the signal-to-noise ratio of said spectroscopy system is improved as compared to the signal-to-noise ratio of said spectroscopy system when said major axis of said slit aperture is oriented essentially parallel to said major axis of said image of said arc lamp;
    said slit aperture having a width not greater than 500 microns;
    said detector comprises a diode array; and
    said apparatus having a signal-to-noise ratio when measuring modulated reflectance of 1 part in 105 with a one second averaging time in the visible—near-UV spectral range.

2. An apparatus according to claim 1, further comprising a power supply connected to said light source.

3. An apparatus according to claim 1, wherein said diode array comprises a plurality of diodes arranged in a row adjacent one another, each diode in said array having a width not greater than about 100 microns.

4. An apparatus according to claim 1, wherein said major axis of said arc lamp is oriented orthogonal to said major axis of said slit aperture.

5. An apparatus according to claim 1, further comprising optical means positioned between said arc lamp and said slit aperture for orienting said major axis of said image of said arc lamp orthogonal to said major axis of said slit aperture.

6. An apparatus according to claim 1, wherein said arc lamp is a short arc lamp.

7. An apparatus according to claim 6, wherein said short arc lamp is selected from the group consisting of xenon, xenon-mercury, and deuterium arc lamps.

8. An apparatus according to claim 1, further comprising an additional optical system positioned between said source and said slit aperture.

9. An apparatus according to claim 8, wherein said additional optical system is a transmission system.

10. An apparatus according to claim 9, wherein said additional optical system comprises a gas analysis system.

11. An apparatus according to claim 8, wherein said additional optical system is a reflectance system.

12. An apparatus according to claim 1, wherein said spectroscopy system is a monochromator.

13. An apparatus according to claim 1, wherein said spectroscopy system is a spectrometer.

14. An apparatus according to claim 1, wherein said spectroscopy system is a reflectometer.

15. An apparatus according to claim 1, wherein said spectroscopy system is an ellipsometer.

16. An apparatus according to claim 1, wherein said spectroscopy system is a reflectance anisotropy spectrometer.

17. An apparatus according to claim 1, further comprising:
    data analysis means for processing data operatively associated with said detector.

18. A method of enhancing the signal-to-noise ratio of a spectroscopy system, said method comprising:
    providing a spectroscopy system having an arc lamp light source of emitted light, which emitted light is emitted as an image of said light source; a slit aperture through which said emitted light is projected; and a detector operably associated with said slit aperture for detecting said emitted light; wherein both said slit aperture, said arc lamp, and said image of said arc lamp each have a major axis; and
    orienting the major axis of said slit aperture essentially orthogonally to said major axis of said image of said arc lamp, so that the signal-to-noise ratio of said spectroscopy system is improved as compared to the signal-to-noise ratio of said spectroscopy system when said major axis of said slit aperture is oriented essentially parallel to said major axis of said image of said arc lamp;
    wherein said detector comprises a diode array;
    said slit aperture having a width not greater than 500 microns; and
    said spectroscopy system having a signal-to-noise ratio after said orienting step when measuring modulated reflectance of 1 part in $10_5$ with a one second averaging time in the visible—near-UV spectral range.

19. A method according to claim 18, wherein said diode array comprises a plurality of diodes arranged in a row adjacent one another, each diode in said array having a width not greater than about 100 microns.

20. A method according to claim 18, wherein said orienting step is carried out by orienting the major axis of said arc lamp orthogonal to said major axis of said slit aperture.

21. A method according to claim 18 said spectroscopy system further comprising optical means positioned between said arc lamp and said slit aperture for orienting said major axis of said image of said arc lamp orthogonal to said major axis of said slit aperture, and wherein said orienting step is carried out with said optical means.

22. A method according to claim 18, wherein said arc lamp is a short arc lamp.

23. A method according to claim 22, wherein said short arc lamp is selected from the group consisting of xenon, xenon-mercury, and deuterium arc lamps.

* * * * *

UNITED STATES PATENT AND TRADEMARK OFFICE
CERTIFICATE OF CORRECTION

PATENT NO.      : 6,411,381 B1
DATED           : June 25, 2002
INVENTOR(S)     : Aspnes et al.

It is certified that error appears in the above-identified patent and that said Letters Patent is hereby corrected as shown below:

<u>Column 8,</u>
Line 46, should read as follows:
-- reflectance of 1 part in $10^5$ with a one second averaging --

Signed and Sealed this

Fifth Day of November, 2002

*Attest:*

*Attesting Officer*

JAMES E. ROGAN
*Director of the United States Patent and Trademark Office*